United States Patent
Chang et al.

(10) Patent No.: US 8,501,051 B2
(45) Date of Patent: Aug. 6, 2013

(54) CATHODE BASED UPON TWO KINDS OF COMPOUNDS AND LITHIUM SECONDARY BATTERY COMPRISING THE SAME

(75) Inventors: Sung Kyun Chang, Daejeon (KR); Hong-Kyu Park, Daejeon (KR); Sinyoung Park, Daejeon (KR); Soo Min Park, Daejeon (KR); Ji Eun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/296,951

(22) Filed: Nov. 15, 2011

(65) Prior Publication Data
US 2012/0112139 A1 May 10, 2012

Related U.S. Application Data

(63) Continuation of application No. PCT/KR2010/005446, filed on Aug. 18, 2010.

(30) Foreign Application Priority Data

Nov. 25, 2009 (KR) ........................ 10-2009-0114780

(51) Int. Cl.
*H01B 1/08* (2006.01)
*H01B 1/02* (2006.01)

(52) U.S. Cl.
USPC ..................... 252/518.1; 252/500; 252/519.1; 252/182.1; 429/218.1; 429/224; 429/231.95

(58) Field of Classification Search
USPC ........ 252/500–519.14, 182.1; 429/218.1–338
See application file for complete search history.

(56) References Cited

U.S. PATENT DOCUMENTS

| | | | |
|---|---|---|---|
| 6,403,257 B1 * | 6/2002 | Christian et al. | 429/224 |
| 6,436,577 B1 * | 8/2002 | Kida et al. | 429/231.95 |
| 7,192,564 B2 * | 3/2007 | Cardarelli et al. | 423/62 |
| 7,217,475 B2 | 5/2007 | Nakanishi et al. | |
| 8,026,008 B2 * | 9/2011 | Kim et al. | 429/338 |
| 2003/0157409 A1 * | 8/2003 | Huang | 429/306 |
| 2004/0197654 A1 * | 10/2004 | Barker et al. | 429/218.1 |
| 2005/0069771 A1 * | 3/2005 | Manev et al. | 429/223 |
| 2006/0093914 A1 | 5/2006 | Tanaka et al. | |
| 2006/0233696 A1 * | 10/2006 | Paulsen et al. | 423/594.4 |
| 2008/0241647 A1 | 10/2008 | Fukui et al. | |
| 2009/0104532 A1 * | 4/2009 | Hosoya | 429/224 |
| 2010/0297510 A1 * | 11/2010 | Kim et al. | 429/338 |

FOREIGN PATENT DOCUMENTS

| | | | |
|---|---|---|---|
| JP | 2002-110253 A | 4/2002 | |
| JP | 2002-289193 A | 10/2002 | |
| JP | 2003-92108 A | 3/2003 | |

(Continued)

OTHER PUBLICATIONS

International Search Report, dated May 23, 2011, issued in PCT/KR2010/005446.

*Primary Examiner* — Tri V Nguyen
(74) *Attorney, Agent, or Firm* — Birch, Stewart, Kolasch & Birch, LLP

(57) ABSTRACT

Provided is a cathode for lithium secondary batteries comprising a combination of one or more compounds selected from Formula 1 and one or more compounds selected from Formula 2. The cathode provides a high power lithium secondary battery composed of a non-aqueous electrolyte which exhibits long lifespan, long-period storage properties and superior stability at ambient temperature and high temperatures.

11 Claims, 1 Drawing Sheet

FOREIGN PATENT DOCUMENTS

| | | |
|---|---|---|
| JP | 2003-282146 A | 10/2003 |
| JP | WO2006027925 A2 * | 3/2006 |
| JP | 2004-134245 A | 9/2009 |
| KR | 10-2004-0026378 B1 | 3/2004 |
| KR | 10-0570417 B1 | 4/2006 |
| KR | 10-0821523 B1 | 4/2008 |
| KR | 10-2008-0088356 A | 10/2008 |
| KR | 10-0915795 B1 | 9/2009 |

* cited by examiner

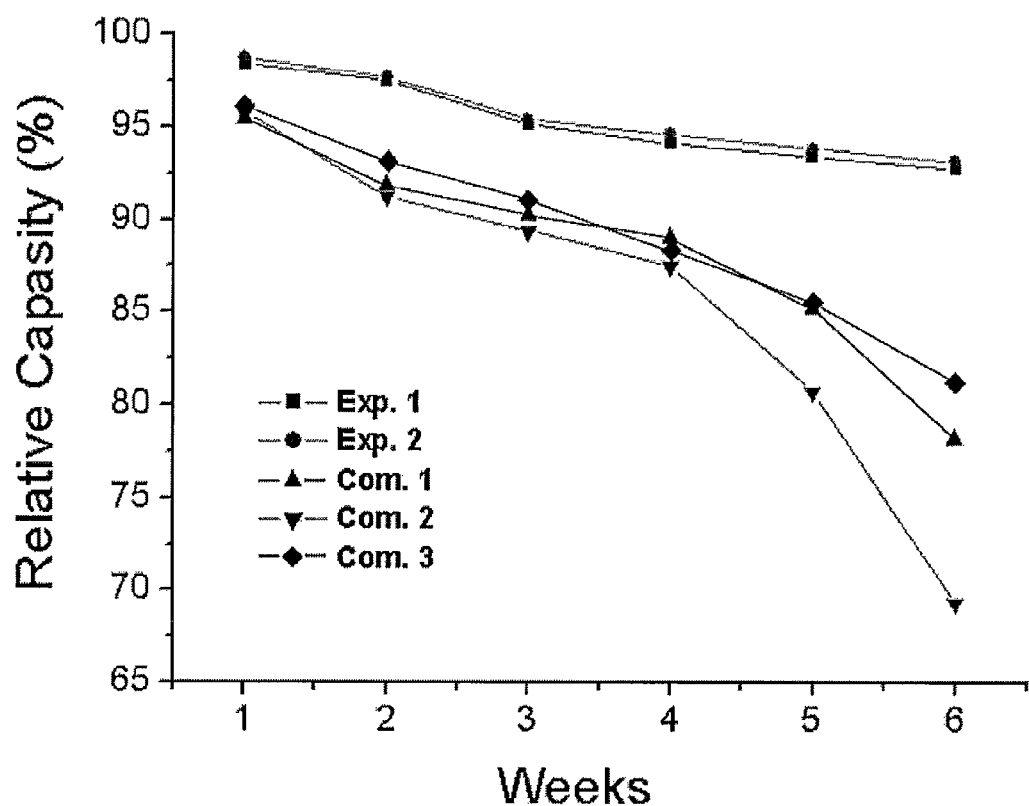

CATHODE BASED UPON TWO KINDS OF COMPOUNDS AND LITHIUM SECONDARY BATTERY COMPRISING THE SAME

TECHNICAL FIELD

The present invention relates to a cathode for lithium secondary batteries comprising a combination of two specific kinds of compounds, thus exhibiting long lifespan, long-period storage properties and superior stability at ambient temperature and high temperatures.

BACKGROUND ART

Technological development and increased demand for mobile equipment have led to a rapid increase in the demand for secondary batteries as energy sources. Among these secondary batteries, lithium secondary batteries having high energy density and voltage, long cycle span and low self-discharge ratio are commercially available and widely used.

In addition, increased interest in environmental issues has brought about a great deal of research associated with electric vehicles (EV) and hybrid electric vehicles (HEV) as substitutes for vehicles using fossil fuels such as gasoline vehicles and diesel vehicles which are a major cause of air pollution. Nickel-metal hydride (Ni—NH) secondary batteries are generally used as power sources of electric vehicles (EV) and hybrid electric vehicles (HEV). However, a great deal of study associated with use of lithium secondary batteries with high energy density, discharge voltage and power stability is currently underway and some are commercially available.

In particular, lithium secondary batteries used for electric vehicles should have high energy density, exert high power within a short period of time and be useful under severe conditions for 10 years or longer, thus requiring considerably superior stability and long-period lifespan, as compared to conventional small lithium secondary batteries.

Conventional lithium secondary batteries used for small-size batteries generally utilize lithium cobalt composite oxide having a layered structure for a cathode and a graphite-based material for an anode. However, lithium cobalt composite oxide is disadvantageous in that cobalt used as a main element is extremely expensive and lithium cobalt composite oxide is unsuitable for use in an electric vehicle in terms of stability. Accordingly, lithium manganese composite oxide having a spinel crystal structure composed of manganese, which is low-cost and exhibits superior stability, may be suitable as the cathode of lithium ion batteries for electric vehicles.

However, when lithium manganese composite oxide is stored at a high temperature, manganese is eluted into an electrolyte, deteriorating battery properties. Accordingly, there is a need for measures to prevent this phenomenon. Further, lithium manganese composite oxide disadvantageously has a small capacity per battery weight, as compared to conventional lithium cobalt composite oxides or lithium nickel composite oxides, thus limiting an increase in capacity per battery weight. Batteries to improve this limitation should be designed in order to practically apply batteries as power sources of electric vehicles.

In order to solve these disadvantages, a great deal of research associated with fabrication of an electrode using a mix cathode active material is conducted. For example, Japanese Patent Application Publication Nos. 2002-110253 and 2004-134245 disclose a technology using a mixture of lithium manganese composite oxide and lithium nickel cobalt manganese composite oxide in order to increase revitalization power or the like, but still having disadvantages of poor cycle lifespan of lithium manganese oxide and limitation of improvement in stability.

Further, Korean Patent No. 0458584 discloses a cathode active material composed of an active material compound having a nickel-based large spherical diameter with an average diameter of 7 to 25 μm and an active material compound having a nickel-based small spherical diameter with an average diameter of 2 to 6 μm (for example $LI_xMn_2O_{4-z}X_z$, in which X represents F, S or P and $0.90 \leq x \leq 1.1$ and $0 \leq X \leq 0.5$) to increase the volume density of an electrode plate and thereby improve battery capacity.

In addition, in order to improve battery capacity, lifespan and high-rate discharge properties, Korean Patent No. 0570417 discloses use of lithium tetraoxide dimanganese having a spinel crystal structure as a cathode active material, Japanese Patent Application Publication No. 2002-0080448 discloses use of a cathode active material containing lithium manganese composite oxide and Japanese Patent Application Publication No. 2004-134245 discloses fabrication of secondary batteries using a cathode active material containing lithium manganese composite oxide having a spinel crystal structure and lithium transition metal composite oxide.

However, in spite of this related art, secondary batteries having suitable lifespan and stability have yet to be developed.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present invention have developed a cathode for secondary batteries comprising a combination of specific two compounds such as a compound of Formula 1 and a compound of Formula 2 and discovered that in the case where a secondary battery is fabricated using such a cathode, performance such as stability and lifespan of the battery can be improved. The present invention was completed based on this discovery.

Technical Solution

Accordingly, the cathode for lithium secondary batteries according to the present invention comprises a combination of one or more compounds selected from Formula 1 and one or more compounds selected from Formula 2:

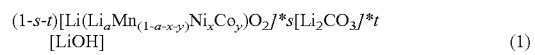

wherein $0<a<0.3$; $0<x<0.8$; $0<y<0.6$; $0<s<0.05$; and $0<t<0.05$, $0<b<0.3$.

As mentioned above, the present invention uses a mixture of a lithium nickel-manganese-cobalt composite oxide having a layered crystal structure and being composed of specific elements and compounds, and lithium manganese oxide having a spinel crystal structure, for a cathode.

Although the composition and actions of lithium carbonate ($Li_2CO_3$) and lithium hydroxide (LiOH) specified in the compounds of Formula 1 is not clearly explained, it is believed that respective drawbacks can be remedied and advantages can be maximized when the compound of Formula 1 is used in combination with the compound of Formula 2. A detailed explanation thereof is given below.

The compound of Formula 2 has advantages of superior thermal stability and low cost, but has disadvantages of small capacity and poor high-temperature properties. These disadvantages are due to the fact that Mn is readily eluted due to structural problems such as Jahn-Teller distortion, which may be considerably increased by HF present in batteries.

On the other hand, in the cathode of the present invention, the compound of Formula 1 which has superior structural stability and is basic inhibits reaction of the compound of Formula 2 exhibiting superior stability, but exhibiting structural instability, when stored at high temperatures, with HF, a strong acid, present in the batteries and induces elution of HF to the compound of Formula 2, thus minimizing the total Mn elution of batteries.

In Formula 1, lithium carbonate ($Li_2CO_3$) and lithium hydroxide (LiOH) are present in a predetermined amount and are preferably in an amount less than 0.05 moles, more preferably, in an amount of 0.03 mole or less, based on the total moles of the compound of Formula 1. When lithium carbonate ($Li_2CO_3$) and lithium hydroxide (LiOH) are present in an amount of 0.05 moles or more, they may disadvantageously induce deterioration in battery capacity and side-reactions.

Preferably, a mix ratio of the compound of Formula 1 and the compound of Formula 2 is 1:9 to 9:1, on a weight basis. When, of two compounds, the compound of Formula 1 is present in an excessively small amount, a problem in which lifespan cannot be obtained to the desired level occurs. On the other hand, when the compound of Formula 2 is present in an excessively small amount, stability of batteries is disadvantageously deteriorated. For this reason, more preferably, a mix ratio of the compound of Formula 1 and the compound of Formula 2 is 2:8 to 8:2, on a weight basis.

It is known that, in Formulae 1 and 2, a site of 6-coordiated structure such as Ni, Mn and Co may be partially substituted by another metal or non-metal element which may have a 6-coordiated structure. The case where the site is substituted by another metal or non-metal element also falls within a range of the present invention. The amount substituted by another element is preferably 0.2 moles or less, based on the total amount of transition metals. When the amount substituted by another element is excessive, disadvantageously, capacity cannot be obtained to the desired level.

In addition, a predetermined amount of oxygen (o) ions may be substituted by other anions in the compounds of Formulae 1 and 2 and such substitution falls with a range of the present invention. Preferably, the substituted anions may be one or more elements selected from the group consisting of halogen elements such as F, Cl, Br and I, sulfur, chalcogenide-based elements and nitrogen.

The substitution of these anions enables improvement of bonding force with transition metals and prevention of structural transition of active materials, thus improving lifespan of batteries. On the other hand, when the amount of substituted anions is excessively high (exceeding a molar ratio of 0.5), the compounds of Formula 1 or 2 become unstable, resulting in a deterioration in lifespan. Accordingly, the amount of substituted anions is preferably 0.01 to 0.5 moles, and more preferably, 0.01 to 0.2 moles.

The compounds of Formulae 1 and 2 constituting the cathode of the present invention may be easily prepared by those skilled in the art, based on the composition equation given above, and a preparation method thereof will thus be omitted.

The cathode of the present invention may be fabricated by adding a mix comprising a binder, an electrode active material and a conductive material to a predetermined solvent such as water or NMP to prepare a slurry and applying the slurry to the collector, followed by drying and rolling.

The cathode mix may further comprise at least one component selected from the group consisting of a viscosity controller and a filler, if necessary.

The cathode current collector is generally fabricated to have a thickness of 3 to 500 μm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel surface-treated with carbon, nickel, titanium, silver or the like. If necessary, these current collectors may also be processed to form fine irregularities on the surface thereof so as to enhance adhesion to the cathode active materials. In addition, the current collectors may be used in various forms including films, sheets, foils, nets, porous structures, foams and non-woven fabrics.

The conductive material improves conductivity of the electrode active material and is commonly added in an amount of 0.01 to 30% by weight, based on the total weight of the mixture including the cathode active material. Any conductive material may be used without particular limitation so long as it has suitable conductivity without causing adverse chemical changes in the fabricated secondary battery. As examples of the conductive materials that can be used in the present invention, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component which enhances binding of an active material to a conductive material and current collector. The binder is commonly added in an amount of 1 to 50% by weight, based on the total weight of the compound including the anode active material. Examples of the binder include polyfluorovinylidene, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene propylene diene terpolymer (EPDM), sulfonated EPDM, styrene butadiene rubber, fluoro rubbers and various copolymers.

The viscosity controller controls the viscosity of the electrode mix so as to facilitate mixing of the electrode mix and application thereof to the collector and may be added in an amount of 30% by weight or less, based on the total weight of the electrode mix. Examples of the viscosity controller include, but are not limited to, carboxymethylcellulose, polyacrylic acid and polyvinylidene fluoride. If necessary, the solvent may also serve as a viscosity controller.

The filler is an adjuvant component optionally used to inhibit expansion of the cathode. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

The present invention also provides a lithium secondary battery comprising the cathode, an anode, a separator and a lithium salt-containing non-aqueous electrolyte.

The anode is prepared by applying an anode active material to an anode current collector, followed by drying. The anode active material may further comprise the afore-mentioned ingredients such as a conductive material and a binder.

The anode current collector is generally fabricated to have a thickness of 3 to 500 μm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, these current collectors may also be processed to form fine irregularities on the surface thereof so as to enhance adhesion to the anode active materials. In addition, the current collectors may be used in various forms including films, sheets, foils, nets, porous structures, foams and non-woven fabrics.

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material are more preferred. The material may be used alone or in combination of two or more thereof.

The separator is interposed between the cathode and anode. As the separator, an insulating thin film having high ion permeability and mechanical strength is used. The separator typically has a pore diameter of 0.01 to 10 in and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolytic solution, solid electrolyte and inorganic solid electrolyte may be utilized.

As the non-aqueous electrolytic solution that can be used in the present invention, for example, mention may be made of aprotic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiCl_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas, fluoro-ethylene carbonate (FEC), propene sultone (PRS) or fluoro-ethlene carbonate (FEC).

The secondary batteries according to the present invention may be used as a unit battery of a battery module, which is a power source of medium and large devices which require high-temperature stability, long cycle properties, high rate properties and the like.

Preferably, the medium and large devices may be electric vehicles (EV), hybrid electric vehicles (HEV) or plug-in hybrid electric vehicles.

Advantageous Effects

As apparent from the fore-going, the present invention provides a non-aqueous electrolyte secondary battery, based on a cathode comprising a specific mixture of lithium manganese cobalt composite oxide and lithium manganese oxide, which can secure stability and improve lifespan at high temperatures.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph showing a capacity decrease of batteries of Comparative Examples 1 to 3 and Examples 1 and 2 with the passage of time in Experimental Example 1.

BEST MODE

Now, the present invention will be described in more detail with reference to the following Examples. These examples are provided only for illustrating the present invention and should not be construed as limiting the scope and spirit of the present invention.

Example 1

An active material composed of a compound having a layered crystal structure represented by $0.9967[Li(Li_{0.1}(Ni_{0.5}Mn_{0.4}Co_{0.1})_{0.9}O_2]*0.0021(LiOH)*0.0012(Li_2CO_3)$ and a compound having a spinel crystal structure represented by Li(Li$_{0.1}$Mn$_{1.8}$Al$_{0.1}$)O$_4$ in a weight ratio of 50:50, a conductive material and a binder were mixed in a ratio of 90:6:4 (active material: conductive material: binder) and the resulting mixture was coated on an Al-foil to a final loading amount of 1.6 mAh/cm$^2$). Carbon was used as an anode and a 1M solution of LiPF$_6$ in a mixed solvent of EC:EMC=1:2 was used as an electrolyte. Based on the configuration, a pouch-type mono-cell was fabricated.

Example 2

A pouch-type mono-cell was fabricated in the same manner as in Example 1 except that an active material composed of a weight ratio of 70:30 of a layered crystal structure compound of 0.9967[Li(Li$_{0.1}$(Ni$_{0.5}$Mn$_{0.4}$Co$_{0.1}$)$_{0.9}$O$_2$]*0.0021 (LiOH)*0.0012(Li$_2$CO$_3$) and a spinel crystal structure compound of Li(Li$_{0.1}$Mn$_{1.8}$Al$_{0.1}$)O$_4$ was used.

Comparative Example 1

A pouch-type mono-cell was fabricated in the same manner as in Example 1 except that an active material composed of a weight ratio of 50:50 of a layered crystal structure compound of Li(Li$_{0.1}$(Ni$_{0.5}$Mn$_{0.4}$Co$_{0.1}$)$_{0.9}$O$_2$] and a spinel crystal structure compound of Li(Li$_{0.1}$Mn$_{1.8}$Al$_{0.1}$)O$_4$ was used.

Comparative Example 2

A pouch-type mono-cell was fabricated in the same manner as in Example 1 except that an active material composed of a weight ratio of 70:30 of a layered crystal structure compound of Li(Li$_{0.1}$(Ni$_{0.5}$Mn$_{0.4}$Co$_{0.1}$)$_{0.9}$O$_2$] and a spinel crystal structure compound of Li(Li$_{0.1}$Mn$_{1.8}$Al$_{0.1}$)O$_4$ was used.

Comparative Example 3

A pouch-type mono-cell was fabricated in the same manner as in Example 1 except that an active material composed of a weight ratio of 50:50 of a layered crystal structure compound of 0.9966[Li(Li$_{0.1}$(Ni$_{0.5}$Mn$_{0.4}$Co$_{0.1}$)$_{0.9}$O$_2$]*0.0034 (Li$_2$CO$_3$) and a spinel crystal structure compound of Li(Li$_{0.1}$Mn$_{1.8}$Al$_{0.1}$)O$_4$ was used.

Experimental Example 1

The batteries fabricated in Examples 1 and 2 and Comparative Examples 1 to 3 were charged and discharged to 1 C within a range of 2.5V to 4.2V and the capacity thereof was measured. At 50% of state of charge (SOC), the batteries were placed in a 50° C. convection oven and capacity decrease thereof was then measured over 5 weeks at an interval of one week. The results are shown in FIG. 1 and Table 1 below.

TABLE 1

|  | Initial | 1 week | 2 weeks | 3 weeks | 4 weeks | 5 weeks | 6 weeks |
|---|---|---|---|---|---|---|---|
| Ex. 1 | 100 | 98.4 | 97.5 | 95.1 | 94.1 | 93.4 | 92.7 |
| Ex. 2 |  | 98.7 | 97.7 | 95.4 | 94.6 | 93.8 | 83.1 |
| Comp. Ex. 1 |  | 95.4 | 91.8 | 90.2 | 89.0 | 85.2 | 78.1 |
| Comp. Ex. 2 |  | 95.8 | 91.2 | 89.4 | 87.5 | 80.7 | 69.3 |
| Comp. Ex. 3 |  | 96.1 | 93.1 | 91.0 | 88.3 | 85.5 | 81.2 |

As can be seen from Table 1 above and FIG. 1, the batteries of Examples 1 and 2 exhibited a considerable small capacity decrease, as compared to the batteries of Comparative Examples 1 to 3. In particular, it can be seen that, as time passes, the difference in capacity decrease increases. Further, the battery of Comparative Example 3 composed of a layered crystal structure compound in which only LiOH is absent exhibited a considerable small capacity decrease, as compared to batteries of Comparative Examples 1 and 2, but exhibited a considerably great capacity decrease, as compared to the batteries of Examples 1 and 2.

Experimental Example 2

The batteries fabricated in Examples 1 and 2 and Comparative Examples 1 to 3 were charged to 1 C and discharged to 1 C at 100 cycles and the capacity thereof was measured. At 50% of state of charge (SOC), the batteries were placed in a 45° C. convention oven and capacity decrease thereof was then measured at 10$^{th}$, 50$^{th}$ and 100$^{th}$ cycles. The results are shown in Table 2 below.

TABLE 2

|  | Initial | 10$^{th}$ cycle | 50$^{th}$ cycle | 100$^{th}$ cycle |
|---|---|---|---|---|
| Ex. 1 | 100 | 99.9 | 98.1 | 96.6 |
| Ex. 2 |  | 100 | 98.4 | 96.8 |
| Comp. Ex. 1 |  | 98.5 | 92.1 | 78.3 |
| Comp. Ex. 2 |  | 98.2 | 91.1 | 67.2 |
| Comp. Ex. 3 |  | 98.7 | 93.5 | 87.4 |

As can be seen from Table 2 above, the batteries of Examples 1 and 2 exhibited a considerably small capacity decrease, as compared to the batteries of Comparative Examples 1 to 3. In particular, it can be seen that, as the number of cycles increases, the difference in capacity decrease increases. It can be seen that this phenomenon is the same in the battery of Comparative Example 3 composed of a layered crystal structure compound in which only LiOH is absent.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode for lithium secondary batteries comprising a mixture of one or more compounds selected from Formula 1 and one or more compounds selected from Formula 2:

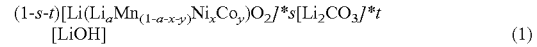

$$(1-s-t)[Li(Li_aMn_{(1-a-x-y)}Ni_xCo_y)O_2]*s[Li_2CO_3]*t[LiOH] \quad (1)$$

$$Li(Li_bMn_{(2-b-c)}M_c)O_4 \quad (2)$$

wherein 0<a<0.3, 0<x<0.8, 0<y<0.6, 0<s<0.05, 0<t<0.05, 0<b<0.3 and 0≤c≤0.2, M is aluminum.

2. The cathode according to claim 1, wherein a mix ratio of the compound of Formula 1 to the compound of Formula 2 is 1:9 to 9:1, on a weight basis.

3. The cathode according to claim 1, wherein a mix ratio of the compound of Formula 1 to the compound of Formula 2 is 2:8 to 8:2, on a weight basis.

4. A lithium secondary battery comprising the cathode according to claim 1.

5. The lithium secondary battery according to claim 4, wherein the secondary battery is used as a unit battery of a battery module being a power source of medium and large devices.

6. A lithium secondary battery comprising the cathode according to claim 2.

7. A lithium secondary battery comprising the cathode according to claim 3.

8. The lithium secondary battery according to claim 6, wherein the secondary battery is used as a unit battery of a battery module being a power source of medium and large devices.

9. The lithium secondary battery according to claim 7, wherein the secondary battery is used as a unit battery of a battery module being a power source of medium and large devices.

10. The cathode according to claim 1, wherein $Li_2CO_3$ and LiOH are present in an amount less than 0.03 moles based on the total moles of the compound of Formula (1).

11. A cathode for lithium secondary batteries comprising a combination of one or more compounds selected from Formula 1 and one or more compounds selected from Formula 2:

$$(1-s-t)[Li(Li_aMn_{(1-a-x-y)}Ni_xCo_y)O_2]*s[Li_2CO_3]*t[LiOH] \quad (1)$$

$$Li(Li_bMn_{(2-b-c)}M_c)O_4 \quad (2)$$

wherein $0<a<0.3$, $0<x<0.8$; $0<y<0.6$; $0<s<0.05$, $0<t<0.05$, $0<b<0.3$ and $0<c\leqq0.2$, M is aluminum, and wherein $Li_2CO_3$ and LiOH are present in an amount less than 0.05 moles based on the total moles of the compound of Formula (1).

* * * * *